(12) United States Patent
Lukas et al.

(10) Patent No.: US 6,743,384 B2
(45) Date of Patent: Jun. 1, 2004

(54) ANISOTROPIC HEAT DIFFUSER PLATE

(75) Inventors: Ken S. Lukas, Granger, IN (US); Chenglung E. Yen, Granger, IN (US)

(73) Assignee: Honeywell International Inc., Morristown, NJ (US)

(*) Notice: Subject to any disclaimer, the term of this patent is extended or adjusted under 35 U.S.C. 154(b) by 104 days.

(21) Appl. No.: 10/046,847

(22) Filed: Jan. 15, 2002

(65) Prior Publication Data

US 2002/0130432 A1 Sep. 19, 2002

Related U.S. Application Data

(60) Provisional application No. 60/277,106, filed on Mar. 19, 2001.

(51) Int. Cl.$^7$ ............................................. G21C 21/00
(52) U.S. Cl. ........................ 264/40.6; 264/328.16; 249/111; 425/407; 425/470
(58) Field of Search ............... 264/40.6, 328.16; 425/547, 552, 407, 470; 249/111

(56) References Cited

U.S. PATENT DOCUMENTS

| | | |
|---|---|---|
| 1,156,756 A | 10/1915 | Chamberlin |
| 3,590,904 A | 7/1971 | Woodburn, Jr. |
| 3,933,335 A | 1/1976 | Maruyama et al. |
| 4,338,068 A | 7/1982 | Suh et al. |
| 4,563,145 A * | 1/1986 | de Meij ............... 425/174.8 R |
| 4,714,424 A | 12/1987 | Kinugasa et al. |
| 4,834,929 A | 5/1989 | Dehoff et al. |
| 5,094,607 A | 3/1992 | Masters |
| 5,114,332 A * | 5/1992 | Benoit et al. ............. 425/407 |
| 5,154,221 A | 10/1992 | Vatant et al. |
| 5,169,549 A | 12/1992 | Weber |
| 5,324,473 A * | 6/1994 | Baresich ................. 264/327 |
| 5,489,410 A | 2/1996 | Baumgartner et al. |
| 5,609,922 A | 3/1997 | McDonald |
| 5,746,966 A | 5/1998 | McDonald |
| 5,783,259 A | 7/1998 | McDonald |
| 5,811,135 A | 9/1998 | Kimura |
| 5,834,337 A | 11/1998 | Unger et al. |
| 6,478,991 B1 * | 11/2002 | Mancosu et al. ......... 264/40.1 |

FOREIGN PATENT DOCUMENTS

WO  WO 00/54949  9/2000

OTHER PUBLICATIONS

Patent Abstracts of Japan; Maeda Yukio; Controlling Device for Heat Conduction and Resin Molding Mold Equipment Using This Device; 10156832; Jun. 16, 1998.

Patent Abstracts of Japan; Tanamura Takeshi; Production of Three–Dimensional Fabric C—C Composite Capable of Freely Controlling Direction of Heat Conductivity; 03164415; Jul. 16, 1991.

* cited by examiner

Primary Examiner—Jill L. Heitbrink
(74) Attorney, Agent, or Firm—Larry J. Palguta

(57) ABSTRACT

A method and apparatus for ensuring uniform temperature regulation of a mold cavity (90) during a mold process is disclosed. An anisotropic diffuser member(s) (100) is/are utilized for rapid providing heat transfer in preferred directions. An anisotropic diffuser member (100) is arranged within or along a mold cavity (90) to ensure that heat is transferred uniformly and rapidly along the target wall of the mold cavity (90). The anisitropic diffuser member (100) may be manufactured from a lay up of graphite fiber reinforced composites that have individual fibers (101) arranged in a uniform direction, e.g., having a characteristic grain. Since heat travels faster along the length (grain) of the individual fibers (101) of the diffuser member (100) than at angles opposed to it, an operator can manipulate heat transfer to ensure that heat is spread evenly along mold cavity (90) walls in a manner that avoids undesirable temperature gradients or hot spots.

14 Claims, 4 Drawing Sheets

ANISOTROPIC HEAT DIFFUSER PLATE

This application claims priority under 35 U.S.C. § 119(e) to U.S. Provisional Application No. 60/277106 for "Anisotropic Heat Diffuser Plate," filed on Mar. 19, 2001, the entire contents of which are hereby incorporated by reference.

TECHNICAL FIELD AND INDUSTRIAL APPLICABILITY OF THE INVENTION

The present invention is generally directed to molds and molding processes, and more particularly to a method and an apparatus for molding processes that utilize an anisotropic diffuser member for uniformly distributing heat within a mold die.

BACKGROUND OF THE INVENTION

The processing of molded materials is a precise operation requiring the precisely timed application of pressure and the application of precise and uniform temperature. Any deviation from the desired parameters often leads to cracks and/or poor resin flow in the resulting product.

The background art includes several examples of related control schemes for regulating mold process temperatures. For example, U.S. Pat. No. 3,933,335 to Maruyama et al. describes a casting mold for casting metals that includes a paper-like sheet of carbon fibers admixed with organic fibers or pulp that is used as a liner between the molten metals within the mold and the mold's interior surface. The carbon fiber sheets include at least 35 percent by weight of carbon fibers in order to prevent undesirable stresses and seizure as a result of contact between the molten metal and the interior surface of the mold.

U.S. Pat. No. 4,388,068 to Suh et al., the entirety of which is herein incorporated by reference, describes an injection molding device and method that includes the use of a variable conductance heat pipe for controlling the rate of cooling of portions of a mold cavity surface separately and independently from other portions of the mold cavity surface. This molding device and method inherently relies upon individualized, active temperature regulation and temperature approximation of numerous sub portions at various locations of the mold.

U.S. Pat. No. 5,154,221 to Vatant et al. describes a device for fixing and cooling a graphite block of a graphite wall of a mold. A mold cavity is formed by a plurality of vertically oriented graphite blocks that make up the mold cavity walls. The individual graphite blocks contain vertical bores arranged in parallel to the surface of the mold cavity walls. Each of the bores permits sprayed jet(s) of cooling fluid into the interior of the blocks to effect cooling of the mold cavities. However, the device of Vatant et al. requires a system for collection and delivery of cooling fluid and/or additional machining of parts to create the vertical bores of each graphite block and cooling system.

U.S. Pat. Nos. 5,609,922; 5,746,966; and 5,783,259, all to McDonald, describe methods and molds for molding processes that incorporate thermal coatings applied to an interior surface of a mold cavity via the use of a thermal spray. The coatings may include ceramics, metal matrix composites, ceramic matrix composites, resins and various combinations thereof. The thermal coating is selected to impart a desired porosity into the interior surface of the mold cavity that will aid in rapid cooling and will add to the structural strength of the mold itself. However, the methods and devices of McDonald rely upon precision manufacturing techniques that necessitate controlled thermal spraying of coatings onto mold cavity components of various sizes and shapes.

U.S. Pat. No. 5,811,135 to Kimura, the entirety of which is herein incorporated by reference, describes a molding apparatus having a conventional molding box structure with a thermally expanding member. FIG. 1 is a side view of a molding apparatus according to the background art. FIG. 2 is a front elevation view of a mold member for the molding apparatus of FIG. 1. FIG. 3 is an exploded perspective view of the mold member for the molding apparatus of FIG. 1. FIG. 4 is a sectional view of a molten material filling mechanism for a molding apparatus according to the background art.

As seen in FIG. 1 through FIG. 4, a molding box structure 10 includes horizontally arranged support elements 11, threaded struts 12, and a plurality of nuts 13. A mold member 20 (shown in two parts, e.g., an upper half 21 and a lower half 22), a pressurizing plate 30, a thermally expanding member 40 and an auxiliary pressurizing mechanism 50 are vertically arranged between the lower two support elements 11 in this order from top to bottom. The thermally expanding member 40 includes a temperature adjusting mechanism 60.

The temperature adjusting mechanism 60 is used to control the pressure that the thermally expanding member 40 imparts to the mold member 20 to sealingly engage the upper and lower halves 21,22 of the mold member. The temperature adjusting mechanism 60 also includes a cylindrical heater (not shown) for heating and expanding the thermal expansion member 40. A cooling oil circuit (not shown) is used to contract and cool the thermally expanding member 40.

During a conventional molding process, the mold member 20 is accommodated between the pressurizing plate 30 and one of the support elements 11a2. The upper and lower molds 21 and 22 have concavities formed in faces opposed to each other, in predetermined configurations, respectively. Each of the molds 21 and 22 further has a plurality of positioning pins 23 for preventing lateral misalignment. The upper mold 21 has a material filling hole 21a formed therethrough to correspond to the central cylinder hole 71 formed through the support plate 11a, as shown in FIG. 4.

A thrusting piston 72 is insertable into the cylinder hole 71 and is connected to a piston 73a of an oil-hydraulic cylinder mounted on and extending through a central portion of the uppermost support plate 11b. Movement of the piston 73a vertically moves the thrusting piston 72 so that molten material accommodated in the cylindrical hole 71 can fill the interior of the mold member 20 through the material filling hole 21a of the upper mold 21. Depending on the type of molding process undertaken, the finished molded product is demolded after the required cooling process or molding process is completed.

However, the aforementioned arrangements of the background art lack a simple method for ensuring the elimination of temperature gradients, e.g., hot spots or other temperature variations along variation portions of the mold cavity. These temperature gradients will likely result in surface cracking, sinks, warping and other forms of distortion or surface irregularity. When the mold cavity is heated in an attempt to ensure adequate mold cavity, e.g., the temperature of the melt, the transfer of heat to the mold cavity should be in a controlled, uniform manner that ensures that temperature control does not result in undesirable heating of the melt that may lead to increased mold cooling times and overall process cycle times.

SUMMARY OF THE PRESENT INVENTION

The present invention overcomes the shortcomings associated with the background art and achieves other advantages not realized by the background art.

The present invention, in part, is a recognition that it will be advantageous to uniformly distribute heat within a mold die or molding cavity during a molding process.

The present invention, in part, is a recognition that the unique properties of fiber reinforced composites can be utilized to produce precision temperature control and heat transfer if manipulated to have a predetermined geometry.

The present invention, in part, provides a mold assembly for a molding process comprising a mold member and an anisotropic diffuser member, the diffuser member comprising a fibrous composite having a plurality of fibers each having a respective length, the fibers being arranged in a lay-up with the length of each fiber arranged in a substantially uniform direction within the diffuser member, wherein the diffuser member is arranged in a position permitting a rapid transfer of heat along the length of each fiber to the mold member.

The present invention, also in part, provides an anisotropic diffuser plate for a mold assembly, the diffuser plate comprising a fibrous composite having a plurality of fibers each having a respective length, the fibers being arranged in a lay-up with the length of each fiber arranged in a substantially uniform direction within the diffuser member, wherein the diffuser member is arranged in a position permitting a rapid transfer of heat along the length of each fiber.

The present invention, also in part, provides a method of controlling process temperatures in a molding apparatus, the method comprising the steps of controlling a temperature of a mold member with a heat source; and arranging an anisotropic diffuser member along a surface of the mold member for distributing heat uniformly along a length of the anisotropic diffuser member.

BRIEF DESCRIPTION OF THE DRAWINGS

The present invention will become more fully understood from the detailed description given hereinafter and the accompanying drawings which are given by way of illustration only, and thus do not limit the present invention.

DETAILED DESCRIPTION OF THE PREFERRED EMBODIMENTS

Figure 1:
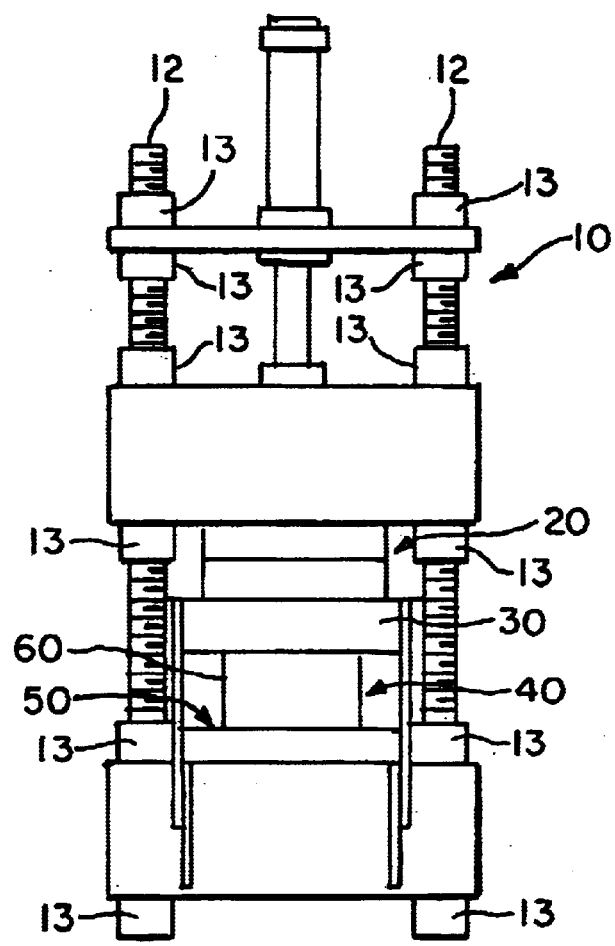
FIG. 1 is a side view of a molding apparatus according to the background art.
Figure 2:
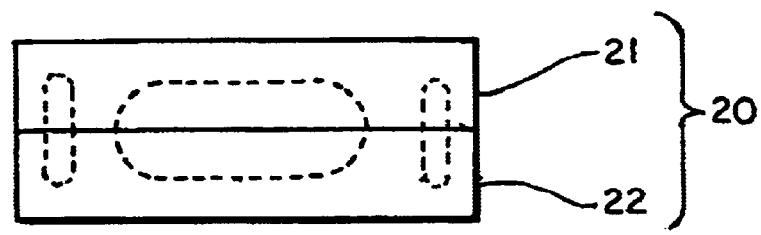
FIG. 2 is a front elevation view of a mold member for the molding apparatus of FIG. 1.
Figure 3:
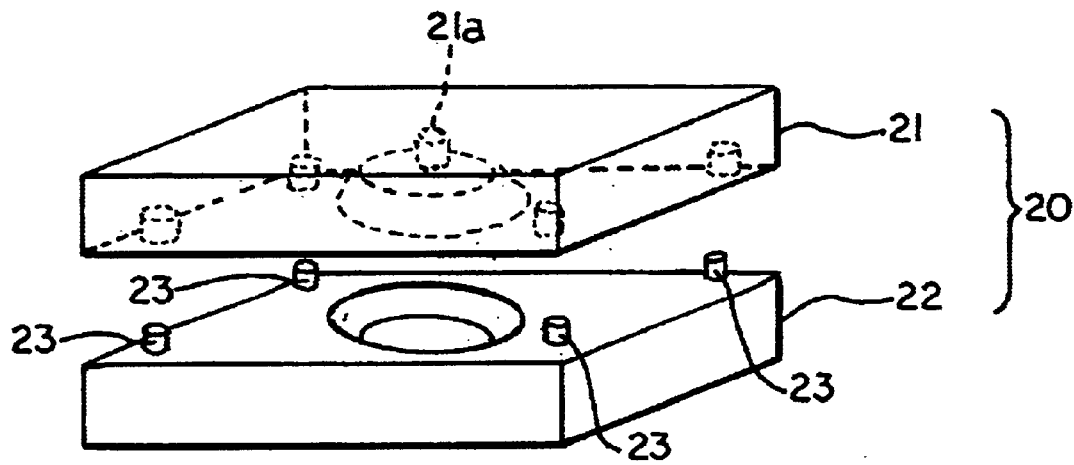
FIG. 3 is an exploded perspective view of the mold member for the molding apparatus of FIG. 1.
Figure 4:
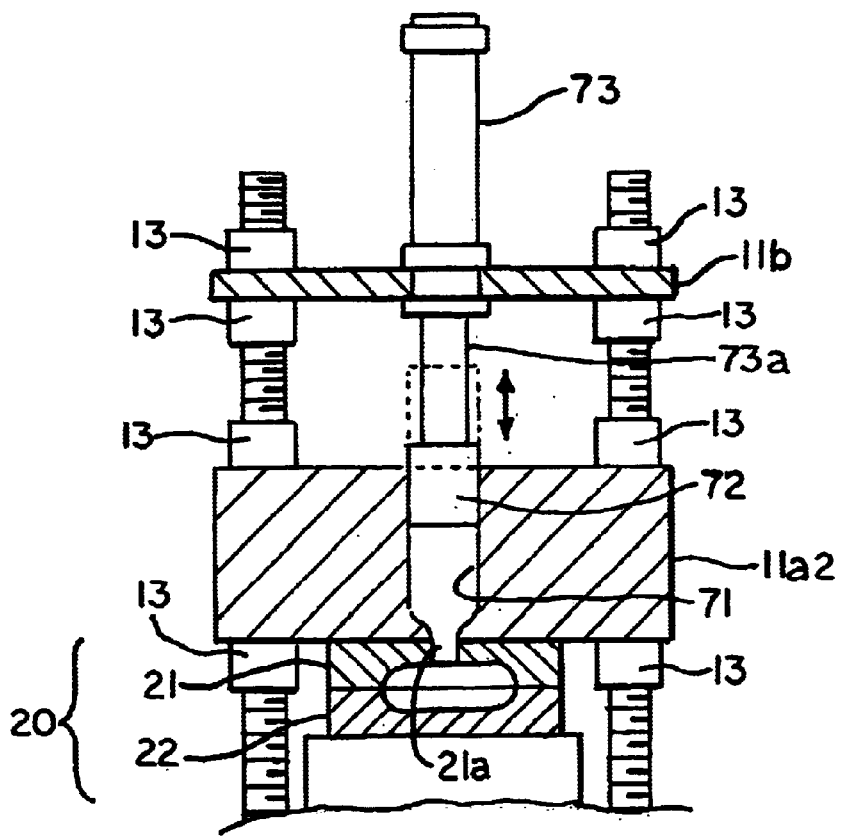
FIG. 4 is a sectional view of a molten material filling mechanism for a molding apparatus according to the background art.
Figure 5:
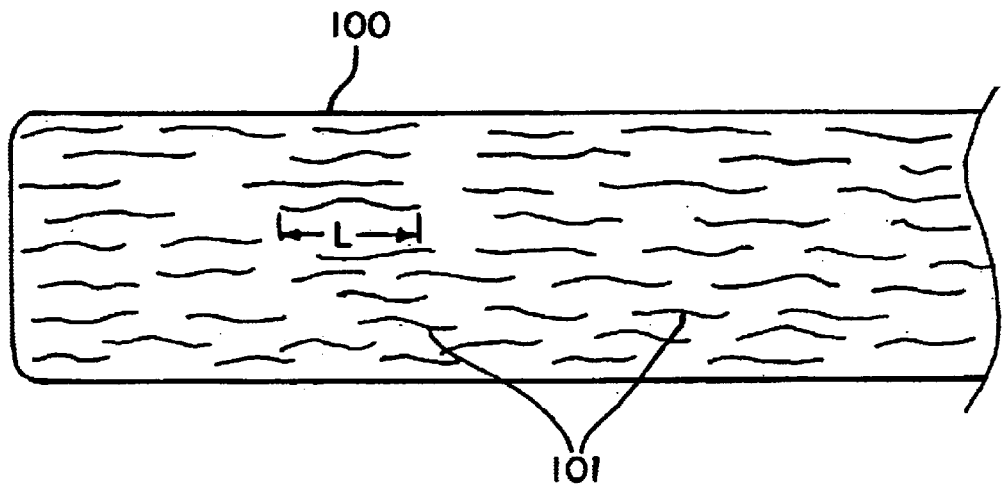
FIG. 5 is a partial side view of an anisotropic diffuser member according to an embodiment of the present invention.
Figure 6:
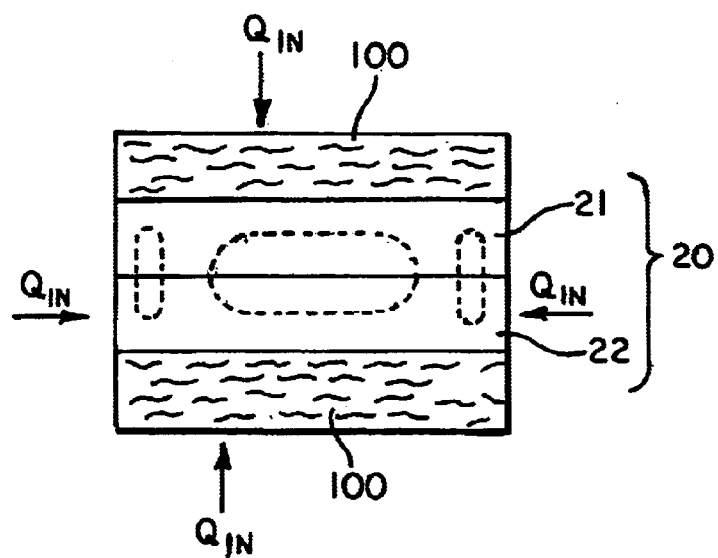
FIG. 6 is a front elevation view of a mold member including anisotropic diffuser members according to an embodiment of the present invention.
Figure 7:
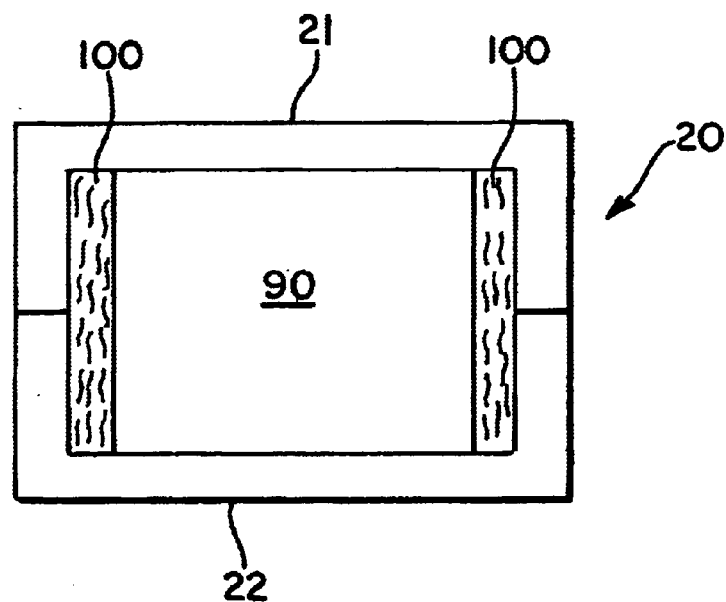
FIG. 7 is a front elevation view of a mold member including anisotropic diffuser members according to an embodiment of the present invention.
Figure 8:
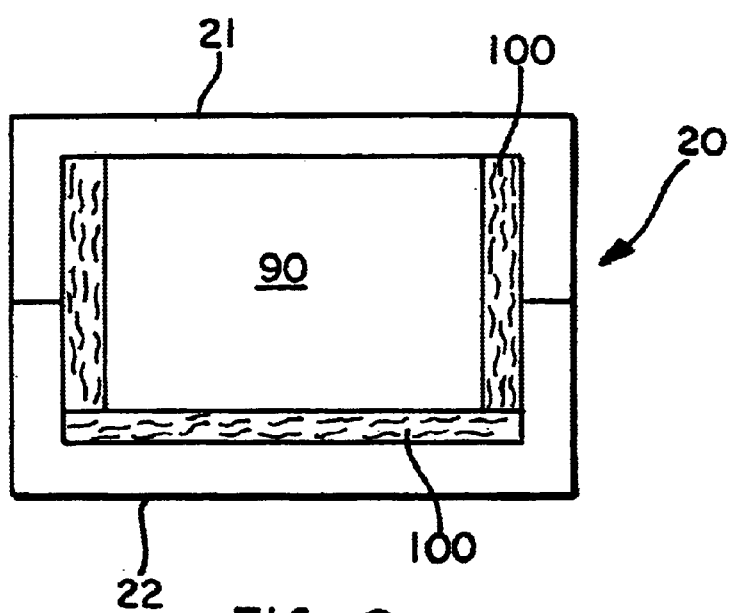
FIG. 8 is a front elevation view of a mold member including anisotopic diffuser members according to an embodiment of the present invention.

The present invention will now be described in detail with reference to the accompanying drawings. FIG. 5 is a partial side view of an anisotropic diffuser member according to an embodiment of the present invention. FIG. 6 is a front elevation view of a mold member including anisotropic diffuser members according to an embodiment of the present invention. FIG. 7 is a front elevation view of a mold member including anisotropic diffuser members according to an embodiment of the present invention. FIG. 8 is a front elevation view of a mold member including anisotropic diffuser members according to an embodiment of the present invention.

The molding apparatus 10 shown in FIG. 1 through FIG. 4 is representative of an applicable mold apparatus and process that may be well suited for the present invention. However, one of skill in the art will appreciate that there are a multitude of molding apparatus 10 and molding processes for which the present invention will be especially advantageous. Further, although a two-part molding member 20 is shown in the accompanying figures, one of skill in the art will appreciate that multi-part molds can be readily employed as desired by the specific molding application.

As aforementioned, molding processes often utilize heaters or other methods of temperature control to ensure uniform temperatures within a mold die or mold cavity. However, depending on the placement of the heaters within or along a mold die or mold cavity, there can be dramatic differences in temperatures throughout the mold cavity. The present invention dramatically reduces these thermal gradients that may occur from uneven heating of a mold cavity.

The present invention utilizes the unique properties of fiber reinforced composites to uniformly distribute the heat within a mold die during a molding process. Fiber reinforced composites can be designed to more rapidly distribute the heat along the length of the die as opposed to the linear distance between the heater, e.g., a heat rod, and the molded piece. Fiber reinforced composites can be placed along the interior of a mold cavity in the same linear direction as the piece being molded. The fiber reinforced composites can be either of a fiber reinforced composite coating or an actual structural plate, such as a diffuser plate.

For example, graphite fiber reinforced composites are ideally suited for the present invention due to their unique thermal properties. The individual fibers can be arranged in a substantially uniform direction, e.g., resembling the grain of a piece of wood. One of skill in the art will appreciate that the individual fibers of a fibrous material, despite being non-linear geometrically, can be arranged so that the lengths of each fiber are generally arranged in parallel to each other.

FIG. 5 is a partial side view of an anisotropic diffuser member 100 according to an embodiment of the present invention. The anisotropic diffuser member 100 has individual fibers 101 that are arranged in a uniform manner along the length of each individual fiber in the lay-up. With this type of diffuser member 100, heat will travel significantly faster in the direction of the fibers, e.g. along their length L, than it will through the direction of the lay-up, e.g. directions transverse to the length L of the fibers 101. When heat is applied in the direction of the lay-up, the heat is diffused rapidly along the lengths L of the fibers 101 and travels much slower against the grain of these fibers 101.

FIG. 6 is a front elevation view of a mold member 20 including anisotropic diffuser member 100 according to an embodiment of the present invention. A two-part mold member 20 is shown having an upper mold member 21 and a lower mold member. In this embodiment, heat can be applied from any or all directions to the mold member 20 by heaters (not shown, but represented by $Q_{IN}$). If the diffuser members 100 were not used, hot spots would likely develop at the individual points of application of the heat from the heaters $Q_{IN}$. Although the rate of distribution of heat along the diffuser member 100 is typically variant with respect to direction or orientation, these anisotropic diffuser members 100 instead force heat to travel rapidly and uniformly along the length of the fibers. Accordingly, uniform temperature distribution is achieved along the upper and lower surfaces of the mold member 20 shown in FIG. 6.

FIG. 7 is a front elevation view of a mold member 20 including anisotropic diffuser members 100 according to an embodiment of the present invention. A pair of anisotropic diffuser members 100 are arranged along a pair of vertical walls of a mold cavity 90 in the mold member 20 shown. If heat were applied along the upper and lower surfaces of the mold member 20 in the embodiment shown in FIG. 7, the vertically arranged diffuser members 100 would ensure that the heat is rapidly transferred along the full length of the mold cavity 90.

FIG. 8 is a front elevation view of a mold member 20 including anisotropic diffuser members 100 according to an embodiment of the present invention. In addition to a pair of vertically arranged diffuser members 100, a horizontally arranged diffuser member 100 is also shown. Although a diffuser member is not shown affixed along an upper surface of the mold cavity 90, one of skill in the art will appreciate that this is possible if the diffuser member is formed so as to still permit the introduction of melt into the mold cavity 90 during a molding process, e.g., machined with an inlet hole to match that corresponding to the mold member 20.

One of skill in the art will appreciate that any number of diffuser members 100 of a variety of sizes and shapes can be applied to a mold cavity 90 according to the present invention. As long as the diffuser members 100 are selected to impart uniform temperature distribution and still conform to the wide variety of mold cavity geometries possible in the molding art, the operator of the molding process is afforded precise temperature control with easy positioning of the diffuser members 100 as desired.

In a preferred embodiment, diffuser members may be approximately 0.5 inches in thickness. However, one of skill in the art will appreciate that the precise dimensions of the diffuser members 100 will depend on the targeted application, e.g., the size and shape of the mold cavity to which it will be applied.

Graphite fiber reinforced composites are particularly advantageous due to their unique thermal properties and fibrous internal structure. However, one of skill in the art will appreciate that alternative materials can be incorporated into the present invention, particularly those showing common properties with those specifically listed in the foregoing embodiments. It will be appreciated that many fibrous composites may be advantageously incorporated into the present invention. Any fibrous material having the ability to be manufactured so as to produce a controlled thermal conductivity as a result of the aforementioned fibrous lay-up is applicable to the present invention and the foregoing embodiments.

A method according to the present invention will now be described with reference to the accompanying drawings and foregoing description. A method of controlling process temperatures in a molding apparatus 10 includes the steps of controlling a temperature of a mold member 20 with a heat source; and arranging an anisotropic diffuser member 100 along a surface of said mold member 20 for distributing heat uniformly from said heat source along a length of said anisotropic diffuser member 100.

The method of controlling process temperatures in a molding apparatus may include a diffuser member 100 having a fibrous reinforced composite with a plurality of fibers each having a respective length L, wherein the fibers 101 are arranged in a lay-up with the length of each fiber 101 arranged in a substantially uniform direction within said diffuser member 100. The diffuser member 100 is arranged in a position permitting a rapid transfer of heat along the length L of each fiber 101. In a preferred embodiment, the fibrous composite is a graphite reinforced composite.

The diffuser member 100 can be arranged in a position along an interior surface of a mold cavity 90 of said molding member 20 as seen in FIG. 7 and FIG. 8. Alternatively, the diffuser member 100 can be arranged along an exterior surface of the mold cavity 90 as seen in FIG. 6 or along a combination of both interior and exterior surfaces. The diffuser member 100 may be applied in the form of a diffuser plate or even a permanently applied thermal coating.

What is claimed is:

1. A method of controlling process temperatures in a molding apparatus, said method comprising the steps of:

controlling a temperature of a mold member with a heat source; and arranging an anisotropic diffuser member along a surface of said mold member for distributing heat uniformly from said heat source through said anisotropic diffuser member, wherein said diffuser member includes a fibrous reinforced composite having a plurality of discontinuous fibers each having a respective length, said fibers being arranged in a lay-up with said length of each fiber being discontinuously arranged to achieve a substantially uniform distribution of heat within said diffuser member.

2. The method of controlling process temperatures in a molding apparatus according to claim 1, wherein said fibrous composite is a graphite reinforced composite.

3. The method of controlling process temperatures in a molding apparatus according to claim 1, wherein said diffuser member is arranged in a position along an interior surface of a mold cavity of said molding member.

4. The method of controlling process temperatures in a molding apparatus according to claim 1, wherein said diffuser member is arranged in a position along an exterior surface of a mold cavity of said molding member.

5. A mold assembly for a molding process comprising:

a mold member; and an anisotropic diffuser member, said diffuser member comprising a fibrous composite having a plurality of discontinuous fibers each having a respective length, said fibers being arranged in a lay-up having a plurality of layers of said discontinuous fibers with said length of each fiber being discontinuously arranged to achieve a substantially uniform heat transfer within said diffuser member, and wherein said fibers within each layer of said plurality of layers are co-planar with adjacent fibers within the same layer.

6. A mold assembly for a molding process comprising:

a mold member; and an anisotropic diffuser member, said diffuser member comprising a fibrous composite having a plurality of discontinuous fibers each having respective length, said fibers arranged in a lay-up with said length of each fiber being discontinuously arranged in a lay-up plane to achieve a substantially uniform heat transfer within said diffuser member, wherein said diffuser member is arranged in a position permitting a rapid transfer of heat along said length of each fiber within say lay-up plane to said mold member.

7. The mold assembly for a molding process according to claim 6, wherein said fibrous composite is a graphite reinforced composite.

8. The mold assembly for a molding process according to claim 6, wherein said diffuser member is a diffuser plate.

9. The mold assembly for a molding process according to claim 6, wherein said diffuser member is a thermal coating.

10. The mold assembly for a molding process according to claim 6, wherein said mold member includes a mold cavity, said diffuser member being arranged within said mold cavity.

11. The mold assembly for a molding process according to claim 6, wherein said mold member includes a mold cavity, said diffuser member being arranged alongside said mold cavity.

12. The mold assembly for a molding process according to claim 6, further comprising a heating member.

13. An anisotropic diffuser plate for a mold assembly, said diffuser plate comprising a fibrous composite having a plurality of discontinuous fibers each having a respective length, said fibers arranged in a lay-up with said length of each fiber being discontinuously arranged in a lay-up plane to achieve a substantially uniform heat transfer within said diffuser member, wherein said diffuser member permits a rapid transfer of heat along said length of each fiber within said lay-up plane.

14. The diffuser plate according to claim 13, wherein said fibrous composite is a graphite reinforced composite.

\* \* \* \* \*